Nov. 11, 1947.   N. A. WESTBROOK   2,430,627
MECHANICAL REVERSING MECHANISM
Filed June 25, 1945   2 Sheets-Sheet 1
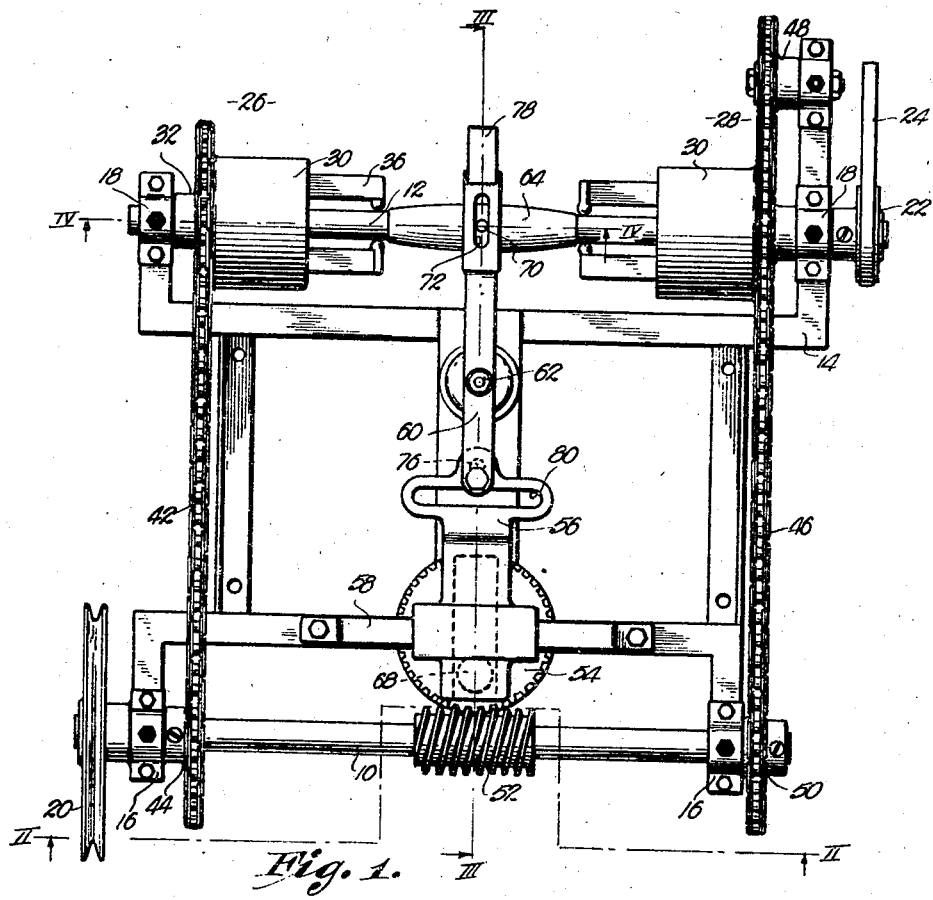
Fig. 1.
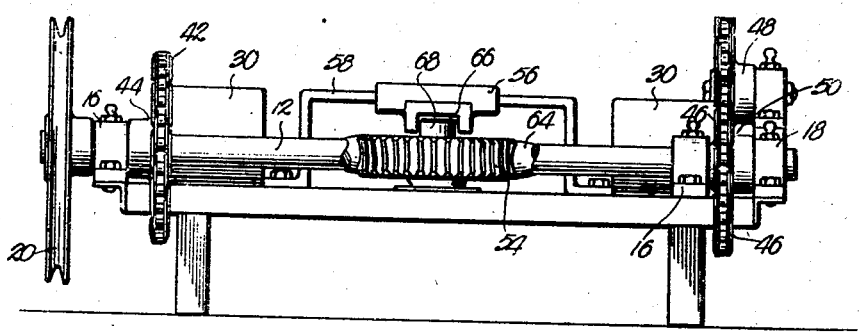
Fig. 2.
INVENTOR.
Nathanial A. Westbrook
BY 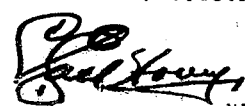
ATTORNEY Nov. 11, 1947.  N. A. WESTBROOK  2,430,627

MECHANICAL REVERSING MECHANISM

Filed June 25, 1945  2 Sheets-Sheet 2

INVENTOR.
Nathanial A. Westbrook
BY
ATTORNEY

Patented Nov. 11, 1947

2,430,627

UNITED STATES PATENT OFFICE 2,430,627

MECHANICAL REVERSING MECHANISM

Nathanial A. Westbrook, Kansas City, Mo.

Application June 25, 1945, Serial No. 601,435

5 Claims. (Cl. 74—323)

This invention relates to a mechanical movement in the nature of reversing mechanism specifically designed for employment with such equipment as washing machines or the like, where the direction of rotation of a member thereof is to be periodically reversed as power is applied to the equipment through a constantly rotating drive shaft.

One of the important aims of my invention is, therefore, to provide mechanical reversing mechanism having rugged, positively acting, and relatively inexpensive means for converting power from a constantly rotating drive shaft into a force which periodically reverses the direction of rotation of a driven shaft that is operatively connected to the work.

Other objects of the invention include the provision, in a mechanical reversing mechanism, of a pair of specially disposed clutches between which is mounted an operating element, motivated by a constantly rotating drive shaft and designed to intermittently engage the clutches with a driven shaft for the purpose of causing work to which the driven shaft is connected, to change its direction of rotation periodically and at timed intervals.

More specifically, this invention has for additional aims, to provide a unitary reversing mechanism capable of attachment to such equipment as a washing machine, and having as a part thereof, a pair of shafts, one of which is connectable to a source of power, while the other is designed for attachment to the work, which shafts have inter-related parts for converting constant rotation of one into periodic rotation in opposite directions of the other shaft.

Other objects and aims of the invention include the specific structure chosen to embody the many details constituting features of the invention, all of which will appear during the course of the following specification, referring to the accompanying drawing, wherein:

Fig. 1 is a top plan view of my mechanical reversing mechanism made in accordance with the present invention.

Fig. 2 is a sectional view taken on line II—II of Fig. 1, looking in the direction of the arrows.

Figure 3:
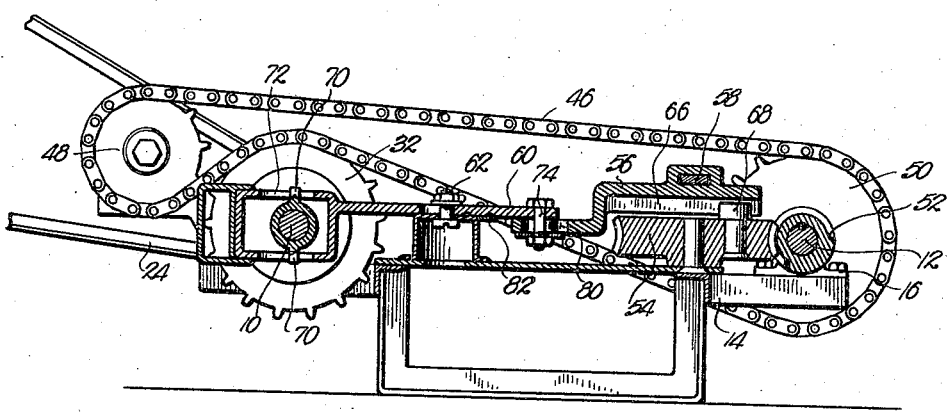
Fig. 3 is a sectional view taken on line III—III of Fig. 1.

In the form of the invention chosen for illustration, the mechanical reversing mechanism comprises a drive shaft 10 and a driven shaft 12, both journalled in suitable bearings forming a part of a supporting frame work, generally designated by the numeral 14.

Bearings 16 carry drive shaft 10, while bearings 18 rotatably support driven shaft 12. These shafts 10 and 12 are in parallel spaced apart relation, and shaft 10 is provided with a pulley wheel or the like 20, through the medium whereof shaft 10 is attachable to any suitable source of power such as an electric motor or engine, not here shown.

Driven shaft 12 has a sheave wheel 22 secured thereto by means of which a belt or the like 24 transmits power in suitable directions of rotation to the washing machine or that part thereof to be oscillated.

Figure 4:
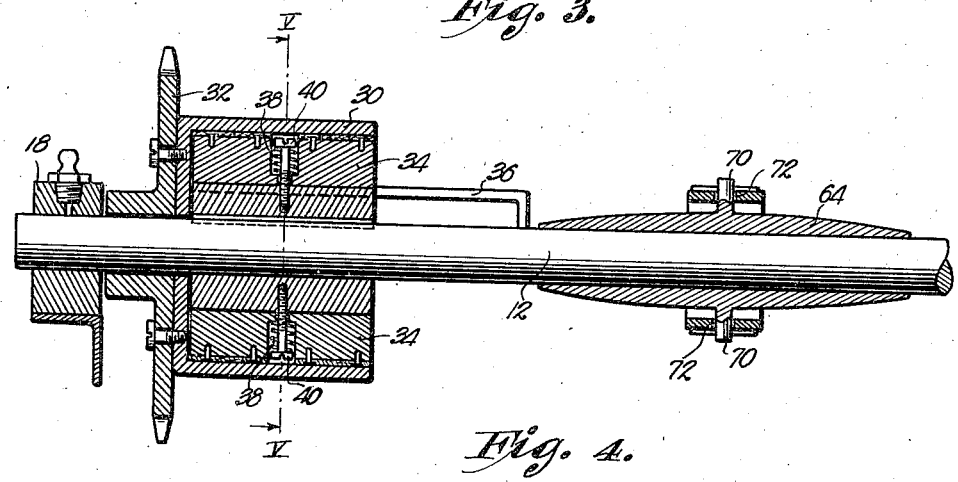
Fig. 4 is an enlarged fragmentary view taken on line IV—IV of Fig. 1.

A pair of clutches 26 and 28 respectively are mounted upon driven shaft 12 in spaced relation to each other and each clutch is identical in character. Each of the clutches 26 and 28 comprises a member 30, freely movable about the axis of shaft 12 and joined to a sprocket wheel 32, as clearly shown in Fig. 4. Member 30 is drum-like in character and contains therein a number of jaws 34 supported by a block 36. These jaws 34 are movable outwardly when arms 36 are swung about their longitudinal axis to tip the same to a position illustrated in dotted lines of Fig. 5. When such is done, the arcuate outer faces of jaws 34 frictionally engage the inner face of member 30 and power being applied to sprocket 32, is transmitted directly to driven shaft 12.

Figure 5:
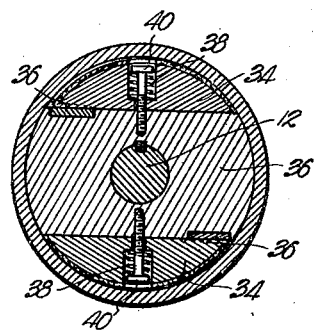
Fig. 5 is a top sectional fragmentary view taken on line V—V of Fig. 4.

The faces of jaws 34 may carry friction material and these jaws are yieldably held in the full line position shown in Fig. 5, by springs 38 held in place by machine bolts 40.

The sprocket 32 on member 30 of clutch 26 has a chain 42 passing therearound and this endless chain in turn passes around a sprocket 44 rigid to drive shaft 10. A sprocket chain 46 passes over the top of sprocket wheel 32 of clutch 28, as clearly shown in Fig. 3, and thence around an idler 48 and then over sprocket 50 on drive shaft 10, all to the end that reversal of rotation of driven shaft 12 occurs when power is shifted from sprocket chain 42 to sprocket chain 46.

Means for periodically reversing the direction of rotation of driven shaft 12 is actuated by drive shaft 10. This means comprises a worm gear 52 rigid to shaft 10, a pinion 54 in mesh with worm gear 52, a head 56 reciprocably or slidably mounted upon bar 58, an arm 60 pivotally mounted as at 62 to frame 14, and the cam 64 slidably supported by driven shaft 12.

Head 56 has a slot 66 in the lower portion thereof to receive stub 68 on pinion 54—thus, because of the eccentricity of stub 68, the rotation of pinion 54 will cause head 56 to reciprocate along bar 58. This reciprocating motion is imparted to the inner end of arm 60 to cause the outer end to shift cam 64 back and forth between clutches 26 and 28.

A pin 70 in cam 64 rides in a slot 72 in arm 60, and a pin 74 in arm 60 engages notch 76 when the mechanism is operatively set.

If it is desired to disconnect the means for reciprocating cam 64, handle 78 is gripped by the operator and the arm 60 will be moved longitudinally to a point where pin 74 will ride in slot 80 as head 56 reciprocates. Thus, drive shaft 10 may constantly rotate without imparting any movement to cam 64.

When cam 64 is holding clutch 26 in engagement in the direction of rotation of driven shaft 12 is the same as the direction of rotation of drive shaft 10. When cam 64 is removed from its engagement with clutch 26 and shifted into engagement with clutch 28, shaft 12 will rotate in a direction opposite to the direction or rotation of shaft 10.

Arm 60 is releasably held in the neutral position by detent 82 (Fig. 3), consisting of a pair of sockets and a button for engagement therein. When in the condition shown in Fig. 3, the button is in one of the sockets but when the arm is moved to a place where pin 74 is in slot 80, the button will be in the other socket. The resiliency of detent 82 allows desired positioning without use of latches or locks.

When arm 60 is in a position to preclude its being operated by head 56, handle 78 may be manipulated by the operator to "inch" the shaft 12 in either direction by selectively moving the cam 64 to engage the desired clutch 26 or 28. Such structure is important for the part of the equipment being driven by shaft 12 may have loading and unloading positions that must be accurate before the equipment may be satisfactorily used.

Having thus described the invention, what is claimed as new and desired to be secured by Letters Patent is:

1. Reversing mechanism comprising a drive shaft having connection to a source of power; a driven shaft connected to the work; a pair of clutches each having independent connection to the drive shaft and selectively engageable with the driven shaft; and mechanism shiftable by rotation of the drive shaft for successively engaging the clutches with the driven shaft, the connection of one clutch with the drive shaft being arranged to rotate the driven shaft in one direction when one of the clutches is connected to said driven shaft, the connection of the other clutch with the drive shaft being arranged to rotate the driven shaft in the opposite direction when the said other clutch is connected to the driven shaft, said shiftable mechanism having a manually operable arm to actuate either of said clutches at will to and from an operative position said arm being longitudinally movable to and from a disengaged position with respect to the shiftable mechanism.

2. Reversing mechanism comprising a drive shaft having connection to a source of power; a driven shaft; a pair of clutches each having a member operably connected to the driven shaft and jaws associated with the members mounted on the drive shaft and selectively engageable with the respective associated member; and mechanism shiftable by rotation of the drive shaft for successively interengaging the jaws and said members; the connection between the drive shaft and one of the clutch members being arranged to rotate the driven shaft in one direction when the jaws associated with that member are in engagement therewith, the connection between the drive shaft and the other clutch member being arranged to rotate the driven shaft in the opposite direction when the jaws associated with the said other member are in engagement therewith said shiftable mechanism having a manually operable arm to actuate either of said clutches independently, said arm having a releasable connection with the said mechanism to completely disengage the former from the latter.

3. Reversing mechanism adapted for use with washing machines or the like comprising a drive shaft; a driven shaft; a pair of clutches on the driven shaft, each of said clutches having a floating member and jaws rigid to the driven shaft movable to and from a position gripping the member; means drivingly joining one of the clutch members to the drive shaft to rotate the driven shaft in one direction when that one clutch member is engaged by the jaws associated therewith; means drivingly joining the member of the other clutch to the drive shaft to rotate the driven shaft in the opposite direction when the member of the other clutch is engaged by the jaws of that clutch; and mechanism shiftable by rotation of the drive shaft for successively operating the jaws of the clutches to the member-engaging position, said mechanism comprising an oscillating arm, a cam mounted on the driven shaft for movement between the clutches by the arm, a reciprocating head for oscillating the arm, and means actuated by the drive shaft for reciprocating the head said arm being releasable from the shifting mechanism upon longitudinal movement thereof in one direction to determine manually actuating either of said clutches at will.

4. Reversing mechanism adapted for use with washing machines or the like comprising a drive shaft; a driven shaft; a pair of clutches on the driven shaft, each of said clutches having a floating member and jaws rigid to the driven shaft movable to and from a position gripping the member; means drivingly joining one of the clutch members to the drive shaft to rotate the driven shaft in one direction when that one clutch member is engaged by the jaws associated therewith; means drivingly joining the member of the other clutch to the drive shaft to rotate the driven shaft in the opposite direction when the member of the other clutch is engaged by the jaws of that clutch; and mechanism shiftable by rotation of the drive shaft for successively operating the jaws of the clutches to the member-engaging position, said mechanism comprising an oscillating arm, a cam mounted on the driven shaft for movement between the clutches by the arm, a reciprocating head for oscillating the arm, and means actuated by the drive shaft for reciprocating the head, said arm and head having a manually releasable joint therebetween.

5. Reversing mechanism of the kind set forth comprising a drive shaft; a driven shaft; a pair of spaced apart clutches on the driven shaft; means drivingly interconnecting the clutches and the drive shaft to rotate the driven shaft in one direction when one clutch is engaged and to rotate the driven shaft in the opposite direction when the other clutch is engaged; and mechanism including a manually operable arm for successively and alternately operating the clutches to and from the engaged condition, said mechanism having a clutch operating member reciprocably mounted on the driven shaft for movement between the clutches, and means actuated by the drive shaft as it is rotated for reciprocating the clutch operating member to alternately engage the said clutches whereby constant rotation causes periodic reversal of rotation of the driven shaft said arm being shiftable to a position to render the clutch operating mechanism, inoperative and movable when in the said position to cause either of the clutches to function.

NATHANIAL A. WESTBROOK.

REFERENCES CITED

The following references are of record in the file of this patent:

UNITED STATES PATENTS

| Number | Name | Date |
|---|---|---|
| 1,077,354 | Lemay | Nov. 4, 1913 |
| 1,149,283 | Pfeiffer | Aug. 10, 1915 |